United States Patent [19]

Erga

[11] Patent Number: 4,948,572

[45] Date of Patent: Aug. 14, 1990

[54] PROCESS FOR THE RECOVERY OF SULFUR DIOXIDE FROM GAS FLOWS

[75] Inventor: Olav Erga, Jakobsli, Norway

[73] Assignee: Sintef, Nth, Norway

[21] Appl. No.: 305,105

[22] Filed: Jan. 31, 1989

Related U.S. Application Data

[63] Continuation of Ser. No. 54,912, May 28, 1987, abandoned.

[30] Foreign Application Priority Data

Sep. 16, 1985 [NO] Norway .................................. 853622

[51] Int. Cl.$^5$ ............................................. C01B 17/00
[52] U.S. Cl. .................................................... 423/242
[58] Field of Search ......................... 423/242 A, 242 R; 55/73

[56] References Cited

U.S. PATENT DOCUMENTS

| | | | |
|---|---|---|---|
| 2,031,802 | 2/1936 | Tyrer ..................................... | 423/243 |
| 3,633,339 | 1/1972 | Wiewiorowski et al. ....... | 423/242 A |
| 3,911,093 | 10/1975 | Sherif et al. .......................... | 423/242 |
| 3,969,492 | 7/1976 | Witte et al. ...................... | 423/242 A |
| 4,519,994 | 5/1985 | Smalheiser ......................... | 423/242 |

OTHER PUBLICATIONS

Erga, Chem. Eng. Sci., vol. 35, pp. 162–169 (1980).
NATO–CCMS Study, Phase 1.1, Status Report on the Sodium Sulfite Scrubbing Flue Gas Desulfurization Process, Contract No. 68-01-4147 (1978).
Mellor, Inorganic and Theoretical Chemistry, vol. II, Supplement II, The Alkali Metals, Part 1, p. 1276 (1961).
Schmidt, Int. J. Sulfur Chem., Part B, vol. 7, No. 1, pp. 11–19 (1972).
Eldring, I. Chem. E. Symposium Series No. 57, Apr. 1979, pp. J1–J20.

*Primary Examiner*—Gregory A. Heller
*Attorney, Agent, or Firm*—Wenderoth, Lind & Ponack

[57] ABSTRACT

$SO_2$ containing gas is purified by means of an aqueous absorption solution, and $SO_2$ is regenerated from this solution. There is used an absorption solution containing a phosphate buffer, and $SO_2$ is removed from the absorption solution together with water by evaporation.

15 Claims, 3 Drawing Sheets

PROCESS FOR THE RECOVERY OF SULFUR DIOXIDE FROM GAS FLOWS

This application is a continuation of Ser. No. 07/054,912 filed May 28, 1987 now abandoned.

The present invention relates to a process for the purification of $SO_2$ containing gases, recovery of $SO_2$ by means an absorption solution, and regeneration of this solution. In particular the invention relates to the use of aqueous buffer solutions as absorption liquid.

THE STATE OF ART

Two main types of processes in which such aqueous buffer solutions are used, are:

Process type 1. "Regular absorption-stripping process" where the absorption of $SO_2$ takes place in a tower in which the gas and the process liquor (absorbent) are contacted countercurrently, and where the absorbent is regenerated by countercurrent contact with open steam at the boiling temperature of the liquor in a stripping tower, and concentrated gaseous $SO_2$ is obtained after condensation of the steam in this flow. The flow of liquor stripped of $SO_2$ which leaves the bottom of the stripping tower, is conveyed back to the absorption tower for new absorption.

The $SO_2$- absorption usually takes place at atmospheric pressure and at the adiabatic saturation temperature (with respect to water vapor) of the feed gas, usually within the range 30°-70° C. The stripping may also be carried out at atmospheric pressure, or at pressures either above or below the atmospheric. In all cases the temperature in the stripping tower will have to be the boiling temperature of the liquor at the actual pressure in the stripping column.

The steam for stripping is often generated by evaporating water from the stripped process liquor in a heat exchanger at the bottom of the stripping tower. Alternatively, the steam may be generated by evaporating pure water, or condensate. In either case the volume of the process liquor is usually very little affected by the stripping operation. Any amount of $H_2O$ evaporated is added to the liquor before the absorber in order to maintain the proper concentration of the absorbent. There is no precipitation of solids in the stripping system, which simplifies its operation.

Process type 2. "Absorption-evaporation process" where the absorption is carried out in a similar way as for type 1, but where the regeneration involves an evaporation in which water is boiled off together with the $SO_2$. Again almost pure $SO_2$ is produced after condensation of the steam in the same way as in process type 1.

In the evaporator the solubility limits of salts present are greatly exceeded and normally such salts will then precipitate forming a thick slurry which is removed from the evaporator. Water, or condensate, is added for redissolving the solids to the proper concentration before the solution is conveyed back to the absorption towers.

As opposed to process type 1 the volume of the slurry leaving the regenerator-evaporator is very much smaller than the volume entering. Another main difference in the principle of the two processes is that they are operated at much different pH-levels. While process type 1 must be operated below pH=4-5 and with very little change in pH over the absorber and stripper in order to obtain the necessary reversibility between the absorber and stripper, a well-known representative of process type 2 discussed below is operated above pH=5 with pH typically dropping from 6.5 to 5.5 from top to bottom of the absorber.

FURTHER DISCUSSION OF PROCESS TYPES 1 AND 2 BY EXAMPLES

As buffer in process type 1 Na-citrates may for instance be used, (Erga, O., $SO_2$ recovery by sodium citrate solution scrubbing, Chem. Eng. Sci. 35 162–169 (1980)). A characteristic feature of said type of process is that the pH in the absorber must be kept almost constant and at a relatively low level in order to accomplish the regeneration by means of regular steam-stripping. This type of process is particularly suitable for gases having a relatively high $SO_2$ content, where the consumption of stripping steam per ton of $SO_2$ produced gets low enough.

The most commonly used buffer in process type 2 is Na-sulfite, $Na_2SO_3$ (Nato CCMS Study) Phase 1.1, Status report on the sodium sulfite scrubbing flue gas desulfurization process, Mar. 1978, Pedco Environmental, Cincinnati, OH. Contract No. 68-01-4147). The reactions utilized in this "sulfite-process" are the following:

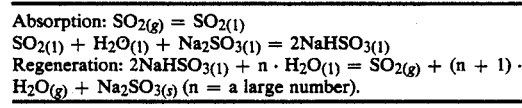

Absorption: $SO_{2(g)} = SO_{2(l)}$
$SO_{2(l)} + H_2O_{(l)} + Na_2SO_{3(l)} = 2NaHSO_{3(l)}$
Regeneration: $2NaHSO_{3(l)} + n \cdot H_2O_{(l)} = SO_{2(g)} + (n + 1) \cdot H_2O_{(g)} + Na_2SO_{3(s)}$ (n = a large number).

Due to precipitation of $Na_2SO_3(s)$ during regeneration the pH in the residual liquid is stabilized, and this facilitates the evaporation of $SO_2$.

It should be noted that for each mole of $SO_2$ absorbed, two moles of $HSO_3^-$ are produced in the sulfite process.

ADVANTAGES AND DISADVANTAGES OF THE SULFITE PROCESS

Today the sulfite process is commercially the most used process for the recovery of $SO_2$ from dilute gases. There are several reasons for this:

1. The consumption of steam in the regeneration step per ton of produced $SO_2$ is at a relatively acceptable level. With double-effect evaporation approximately 7–8 tons are required per ton of $SO_2$, and this is particularly favourable for gases of relatively low $SO_2$ content. In comparison the said citrate process normally would require about 20 tons of steam per ton of $SO_2$ for gases with 0,25 mole- % $SO_2$, although this amount can be much reduced with the use of vapour recompression.

2. The requirements for a very high purification of the gas with respect to $SO_2$ may normally be satisfied due to a relatively high pH value in the regenerated absorption solution. A regular absorption-stripping process, for instance based on the sodium citrate buffer, which would have to operate at a substantially lower pH level, cannot so easily satisfy very strict clean-up requirements.

3. The sulfite process is in principle based on very simple chemical reactions. In particular, it is attractive in that it generates its own buffer anion from absorbed $SO_2$, when a Na-base is added:

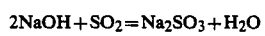

$2NaOH + SO_2 = Na_2SO_3 + H_2O$

4. The sulfite process was developed for commercial use relatively early. Such a process development is very resource demanding. The success of the sulfite process may thus have delayed the search for alternative processes.

Although successful, there are features which complicate installation and operation of the sulfite process:

a. When the process is used for gases containing oxygen, $S_{IV}$ species are lost by oxidation, e.g.

$$Na_2SO_3 + \tfrac{1}{2}O_2 = Na_2SO_4.$$

The Na-sulfate formed must be removed from the solution, and the lost Na-sulfite must be replaced. This requires the addition of Na-base. Considerable oxidation losses, corresponding to 3–10% of absorbed $SO_2$, have been reported. Corresponding losses for the said citrate process have been reported to be less than 1–2%.

b. Selective removal of Na-sulfate from the process liquor, for instance by precipitation, is a complicated operation, and in addition to the alkali consumption with $Na_2SO_4$, it will also entail a loss of Na-sulfite/Na-bisulfite due to incomplete selectivity. There is a limited market for $Na_2SO_4$, and deposit of this water soluble salt is problematic.

c. High concentrations of sulfite - bisulfite in all process stages give rise to undesired disproportioning reactions such as 6 $NaHSO_3 \rightarrow 2\ Na_2SO_4 + Na_2S_2O_3 + 2\ SO_2 + 3\ H_2O$ and/or 2 $Na_2SO_3 + 2\ NaHSO_3 \rightarrow Na_2S_2O_3 + 2\ Na_2SO_4 + H_2O$. One remedy for reducing the $Na_2S_2O_3$ formation is to keep the concentration of said component relatively high, but this again leads to a certain reduction of the solubililty of the buffer and thereby a loss of buffer capacity.

d. The absorption capacity of the sulfite buffer is limited due to limitations in the useful pH-range and the solubility of Na-sulfite and of Na-pyrosulfite ($Na_2S_2O_5$). (Na-bisulfite is not known in solid form, instead $Na_2S_2O_5$ is obtained as an anhydrite: 2 $NaHSO_3 = Na_2S_2O_5 + H_2O$). Below a pH of about 5.5 and above a pH of about 6.5 the buffering effect is small and rapidly decreasing, so that the acceptable pH-range for commercial operation tends to be from about 5.5 to 6.5. pH-values higher than 6.5 have L been reported to be detrimental when the gases contain $CO_2$ ($CO_2$ absorption). This entails that the absorption liquid must be conveyed back to the absorption tower with a considerable content of bisulfite.

e. The evaporation for regenerating the absorption solution is a particularly demanding process step. The solubility of $Na_2SO_3$ (and also of $Na_2SO_4$ which will be present in a considerable concentration) drops with increasing temperature and therefore only a very small temperature difference must occur for heat transfer in the heat exchangers used (="approach temperature") since otherwise deposits will form in the exchangers. This requires very large heat exchangers and very high volumetric circulation rates for the slurry through the heat exchangers. As an example a slurry circulation of 8.64 m³/s=31100 m³/h is reported when the process is used for the production of 8.7 tons of $SO_2$/h in a 500 MW coal-fired power plant.

f. In order to sustain the gas cleaning process during limited periods when the regenerator system is shut down for maintenance the absorber must be provided with large storage tanks for the feed and product liquor.

DESIRABLE GOALS WITH AN ALTERNATIVE PROCESS

There would obviously be much to gain if said undesirable properties of the sulfite process could be reduced or eliminated in a new process, while at the same time maintaining the said desirable properties. Such a process could belong to process type 2 above or be a combination of processes in which the majority of the $SO_2$ is removed by regular absorption-stripping (process type 1) while the final removal takes place by absorption-evaporation (process type 2).

THE INVENTION, GENERAL PRESENTATION

Figure 1:
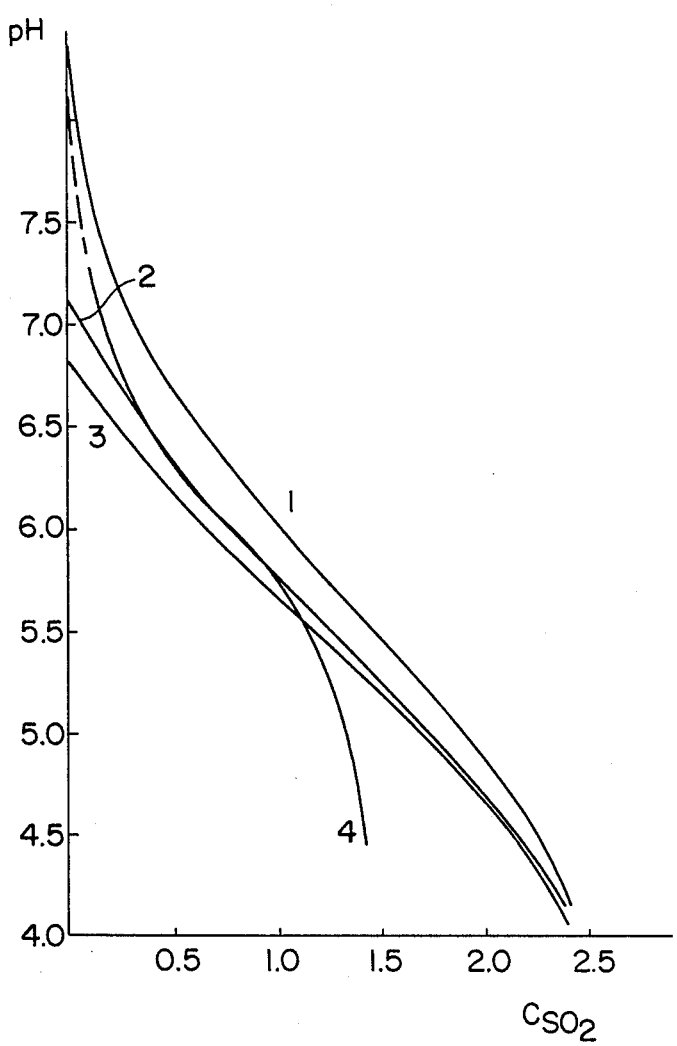
FIG. 1 shows buffer curves for certain solutions charged with $SO_2$.

We have found a new regenerative process for $SO_2$ absorption from gases by means of aqueous buffer solutions combined with recovery of $SO_2$ from such solutions, wherein the following advantages in comparison with known processes are offered:

1. Higher absorption capacity per unit volume of liquid.
2. Less oxidation losses.
3. Lower energy consumption for $SO_2$ recovery.
4. Less problematic regeneration of the absorption liquid.
5. More complete $SO_2$ removal from the gases.

In a comprehensive program a number of buffer systems have been tested and compared with the sulfite buffer. It was discovered that aqueous $Na_2HPO_4$ - $NaH_2PO_4$ solutions combine a number of desirable properties to a surprisingly high degree. The invention utilizes the following reactions:

Absorption: $SO_{2(g)} = SO_{2(l)}$
$SO_{2(l)} + H_2O_{(l)} + Na_2HPO_{4(l)} = NaHSO_{3(l)} + NaH_2PO_{4(l)}$
Regeneration:
$NaHSO_{3(l)} + NaH_2PO_{4(l)} + n \cdot H_2O = SO_{2(g)} + (n + 1) \cdot H_2O_{(g)} + Na_2HPO_{4(s)}$ (n = large number).

$SO_2$ is absorbed in an aqueous solution free of solids, utilizing the first two of the reactions above. The solution loaded with $SO_2$ is thereafter subjected to evaporation, whereby water and $SO_2$ are expelled, utilizing the third reaction. Most of the water is boiled off in this operation, leaving a solution/slurry of very high concentration. The evaporated solution has the appearance of a viscous solution in which only minor amounts of precipitate can be seen in contrast to an evaporated sulfite solution in the sulfite system described above, which contains large amounts of precipitated sulfite crystals. The steam-$SO_2$ mixture is passed through a condenser, leaving almost pure, gaseous $SO_2$ as product. Regenerated, solids-free buffer, ready for new absorption, is produced by adding the proper amount of water or condensate to the concentrate drawn from the evaporator circuit.

As shall be demonstrated by Examples 1 and 2 given below, this new phosphate process is operated inside a pH-range of 4.5–6.5, i.e. practically the same as for the sulfite process discussed above. The process therefore clearly belongs to process type 2.

If a phosphate buffer should be used as process type 1, at the low pH then required (pH inside the range 3-4.5) the buffer would have been practically empty of $Na_2HPO_4$, and only the first dissociation step would act as buffer in $SO_2$-absorption:

$$SO_{2(1)} + H_2O_{(1)} + NaH_2PO_{4(1)} = NaHSO_{3(1)} + H_3PO_{4(1)}.$$

In advance there were good reasons to fear serious difficulties associated with the use of phosphate buffers in process type 2. One must here bear in mind that one is dealing with very concentrated, saturated and non-ideal aqueous solutions in the evaporation-regeneration stage.

Comparing the phosphate with the corresponding sulfite system discussed earlier, it is seen that a successful operation of the phosphate process requires the $Na_2HPO_4$ to precipitate in preference to the $Na_2SO_3$, in the evaporation stage. If $Na_2SO_3$ precipitates such as in the sulfite system, then an equivalent amount of $SO_2$ would not be expelled in the evaporator. Since very nearly the same (high) pH-range is used in the new phosphate process as in the sulfite process, $Na_2SO_3$-precipitation was likely to occur.

On the other hand the concentration of $NaH_2PO_4$ may get very high following the $SO_2$-absorption, for instance 2.5 M compared with 1.5 M for $Na_2HPO_4$, when a 3.0 M $Na_2HPO_4 + 1.0$ M $NaH_2PO_4$ buffer is used to absorb 1.5 M $SO_2$ (Examples 1 and 2 below). One may fear that this situation is aggravated when the solution undergoes further concentration during evaporation. If $NaH_2PO_4$ precipitates, pH will increase and the $SO_2$ evaporation would then be hampered. Also the chances for $Na_2SO_{3(s)}$-precipitation would increase.

In fact, several observations indicating serious problems for the regeneration of the phosphate buffer are reported in the literature:

(i) Smith in U.S. Pat. No. 2,258,629 (1941) reports that $Na_2HPO_{4(s)}$ cannot be produced from $Na_2HPO_4.12H_2O$ by heating, since such heating results in "a deliquescence of the same so that a clear liquid mass is produced which is extremely difficult to treat". (col. 1, 1.26-28). $Na_2HPO_4.12H_2O$ contains 61% $H_2O$ which compares well with the 55% $H_2O$ in the phosphate buffer in Example 1 below. If $Na_2HPO_4$ does not precipitate, one would expect the process not to function properly, as explained above.

(ii) Mellor ("Supplement to Mellor's Comprehensive Treatise on Inorganic and Theoretical Chemistry", Volume II, Supplement II, The Alkali Metals, Part 1, Published 1961, page 1276) discloses that $SO_2$ can be absorbed in $Na_2HPO_4$-$NaH_2PO_4$-$H_2O$ buffers and "can be removed by boiling, except from concentrated solutions" (1.21-22).

(iii) Schmidt (Int. J. Sulfur Chem., Part B, Vol. 7, No. 1, 1972, p. 11-19) recommended (in IX, p. 17) the use of the chemically stable phosphate system $H_2PO_4^-/HPO_4^{2-}$ as the active buffer for $SO_2$ capture, instead of the $HSO_3^-/SO_3^{2-}$-buffer. Schmidt claimed that thereby "losses via oxidation or disproportioning of sulfite would be drastically reduced". Despite the wide distribution of this publication, such developments have not materialized. Unexpected difficulties experienced with the phosphate system is believed to be the reason for this.

Thus, the chemical conditions encountered when a phosphate buffer is used in process type 2 were at the outset quite unclear. This may have contributed to keeping other research workers from thoroughly investigating the phosphate system for use as a buffer within process type 2. Another reason may have to do with some apparently negative test results: As shown below, when measured $SO_2$ partial pressure of $SO_2$ loaded solutions at normal absorption temperature is plotted against the $SO_2$-concentration in the solution, the curve for phosphate buffers falls much below the curve for the sulfite buffer. (See FIG. 2). This could be taken as an indication that the $SO_2$ evaporation from the phosphate buffer system would require much more energy which would immediately exclude this buffer as a relevant competitor.

The use of Na-phosphate as a buffer for $SO_2$-absorption is known from the literature (Eldring A. K., The Stauffer $SO_2$ abatement system I. Chem. E. (London) Symposium No. 57, "The Control of Sulfur and other Gaseous Emissions", Salford, Apr. 1979, p J1-J20; Sherif et.al. U.S. Pat. No. 3,911,093; and Smalheiser, U.S. Pat. No. 4,519,994). However, in the phosphate process referred to therein the regeneration procedure is completely different: $H_2S$ is added to the $SO_2$-loaded solution, utilizing the reaction $2H_2S + SO_2 \rightarrow 3S_{(s)} + 2H_2O$. Thus, the process produces elemental sulfur and not $SO_2$, as in the present invention.

These disclosures do therefore not cover the present invention. In addition they emphasize the advantage of a relatively low pH in order to avoid operational problems with formation of colloidal sulfur. Smalheiser, column 1, lines 5-8 and 50-55, stresses that regeneration follows the procedure covered by the earlier patent by Sherif et.al., where the advantage (necessity) of using a low pH between 2.5-5, preferably 2.8-4.5 (column 7, lines 33-43) is stressed. It is characteristic that Smalheiser repeatedly emphasizes that his invention will function at relatively low pH when high phosphate concentrations are used (thereby meeting Sherif's requirement).

In any case, since the regeneration is by reaction with $H_2S$ the volume of the process liquor is not affected, and the special problems of regeneration by evaporation are not experienced.

The use of phosphate buffers for $SO_2$ absorption is also covered by Tyrer. U.S. Pat. No. 2,031,802. However, this patent describes a process involving "aqueous solutions containing one or more salts of substantially non-volatile acids which have dissociation constants lying between $1 \times 10^{-2}$ and $1 \times 10^{-5}$ (page 1, col. 1. lines 22-25). Further, "On absorption of sulfur dioxide and consequent generation of sulfurous acid in solution, double decomposition occurs and an equilibrium is set up between the salt of the non-volatile acid and sulfurous acid on the one hand and a sulfite or bisulfite and the free non-volatile acid on the other hand" (page 1, col. 1, lines 26-33). Suitable acids are: Lactic acid, glycollic acid, citric acid or ortho-phosphoric acid with first dissociation constants $1.4 \times 10^{-4}$, $1.5 \times 10^{-4}$ $1 \times 10^{-3}$ and $1 \times 10^{-2}$ respectively (page 1, col. 1, lines 45-51). Monobasic phosphates exemplified by $NaH_2PO_4$ and $NH_4H_2PO_4$ are recommended, alone or in combination with e.g. sodium citrate (page 1, col. 1, line 52 to page 1, col. 2, line 20).

Recalculation of Tyrer's data in Example 1 thereof shows that a citrate buffer with 0.168 M $Na_3Ci$ absorbs 1.09 M $SO_2$ from a gas flow with 10% $SO_2$ in air. After regeneration "by heating" 0.313 M SO$_2$ is left in the regenerated solution, which is then ready for new absorption. With this much SO$_2$ in the liquor that is fed to the absorber, it is clear that only the first dissociation step of citric acid is actually available for SO$_2$-absorption by the regenerated buffer. This is in complete agreement with the discussion above.

Tyrer's patent mentions several places that the solvent is regenerated by heating and/or reduction of pressure (page 1, col, 1, lines 6–7 and 39–40, page 2, col. 1, lines 14–18 and 25–28). Only in Example 3 of Tyrer's patent is the text more precise. This example is a comprehensive description of a feasible procedure for carrying out the invention. The SO$_2$ containing liquor from the absorption tower is fed to the top of a "packed-tower" provided at its base with a steam coil for heating the liquor to its boiling point, the dissolved SO$_2$ being driven off by the rising current of steam". This is a regular absorption-stripping process defined as Process type 1 above, and is the expected way of operation when the process is operated at the low pH dictated by the use of the first ionization step of phosphoric and citric acid as the active buffer in SO$_2$ absorption.

It should be emphasized that even if one should choose to interpret some examples of Tyrer's U.S. Pat. No. 2,031,802 so as to include regeneration by boiling, the buffer used is not the same as in the present invention, since Tyrer's data proves that he was operating at the low pH level where Na$_2$HPO$_4$ was not the active buffer, but instead the first dissociation step of phosphoric acid was made use of.

Altogether, the above discussion shows that Tyrer's patent does not interfere with the present invention.

According to the present invention there is provided a process for the purification of SO$_2$ containing gases by means of an aqueous absorption solution in an absorption unit and regeneration of this solution after absorption, which comprises 1 absorbing from said gases SO$_2$ in an aqueous absorption solution which is added to the absorption unit with a pH of about 6.0 and a content of at least 2.0 moles of disodiumhydrogen-phosphate per liter, after absorption removing SO$_2$ from the absorption solution together with water by evaporating at least 70% of the water in the absorption solution, to form an evaporation residue which is diluted with water to form a regenerated absorption solution which may be added to the absorption unit, and recovering SO$_2$ from the evaporated water-SO$_2$-mixture.

The starting buffer may according to the invention be a pure Na$_2$HPO$_4$-solution with a concentration of above 2.0 moles/1. However, it has been found advantageous to use a Na$_2$HPO$_4$-NaH$_2$PO$_4$ mixture with a molar ratio in the range 30:1 to 1:1, preferably 12:1 to 2:1. Thereby the buffer curve is flattened out so that undesirable high pH values are avoided for buffers with low SO$_2$ content and nearly all SO$_2$ may then be removed from the solution during regeneration. As mentioned, this possibility does not exist with the sulfite buffer.

Very important findings in our investigations are the comparatively higher absorption capacity (in kmoles per m$^3$ of buffer solution) and the lower specific steam consumption (in tons of steam per ton of SO$_2$ stripped) that can be reached in comparison with the sulfite buffer. In particular, for gases having a relatively high SO$_2$ content very much is to be gained compared with the sulfite process, since the steam consumption can be reduced as far down as to half the amount. At the same time considerable savings are obtained in the form of smaller equipment units.

It has also been found that the SO$_2$ content in the purified gas may readily be reduced to values substantially below the strictest requirements. The mixed Na$_2$HPO$_4$-NaH$_2$PO$_4$ buffer solution is surprisingly easy to deplete of SO$_2$ by evaporation. In fact, in experiments reported below the phosphate buffer was even easier to deplete of SO$_2$ by evaporation than the sulfite buffer, despite a substantially lower SO$_2$ partial pressure curve at absorber conditions.

The oxidation losses have most surprisingly been found to be negligible in comparison with the sulfite process. With the much lower total concentration level of S$_{IV}$ compounds in the liquid in all process staqes the disproportioning reactions are restrained rather effectively in comparison with the sulfite process where such concentrations are high throughout the process.

Unlike Na$_2$SO$_3$, Na$_2$HPO$_4$ and NaH$_2$PO$_4$ have positive temperature coefficients for their solubilities, at least as far as up to about 95° C. As long as the regeneration is carried out at temperatures around or below about 95° C. there should be no risk of deposit formation of the buffer salts in the heat exchangers of the evaporators as mentioned above for the sulfite system. In addition, since the oxidation losses are negligible, the concentration of Na$_2$SO$_4$ in the circulating process liquid can be kept very low. The solubility of Na$_2$SO$_4$ has a slightly negative temperature coefficient up to about 120° C., and the formation of deposits thereof could be expected in this range. Despite these factors no deposit formation has been observed on the heating elements when the phosphate buffers used according to the invention are evaporated at atmospheric pressure.

In summary this means that relatively much more compact and cheaper equipment may be used and much less pumping energy will be required.

ILLUSTRATIONS OF THE INVENTION BY RESULTS OF EXPERIMENTS

A. High buffer and absorption capacities for SO$_2$

A proper buffer should have a high buffer capacity for SO$_2$, reflected by a small slope of the buffer curve (small change in pH) over a wide SO$_2$ concentration range.

FIG. 1 shows buffer curves at 55° C. for (1) 3M Na$_2$HPO$_4$, (2) 3 M Na$_2$HPO$_4$+0.5 M NaH$_2$PO$_4$, (3) 3 M Na$_2$HPO$_4$+1.0 M NaH$_2$PO$_4$ and (4) 1.70 M Na$_2$SO$_3$, all charged with SO$_2$. The abscissa is the SO$_2$ concentration in moles per liter, and the ordinate is the pH. We have found that pH is rather difficult to measure correctly in such solutions, and the curves should therefore primarily be used for comparing the different buffers. It is striking how the phosphate buffers keep a relatively high buffer capacity over a wide range of SO$_2$ concentrations. From FIG. 1 the following may also be concluded:

The sulfite system is a poor buffer above a pH of about 6.6 and below a pH of about 5.5. This is in agreement with the above discussion.

The three buffer curves from the phosphate system demonstrate the great flexibility of this system. By adding some NaH$_2$PO$_4$ to the Na$_2$HPO$_4$ buffer unfavorably high pH values for low SO$_2$ concentrations are avoided. It has been found that such buffers may be depleted more readily of SO$_2$ during the evaporation.

The concentrations of the buffers used as examples in FIG. 1 are believed to be about as high as possible in order to be relevant for commercial installations where precipitation in the absorber due to supersaturation must be avoided.

Figure 2:
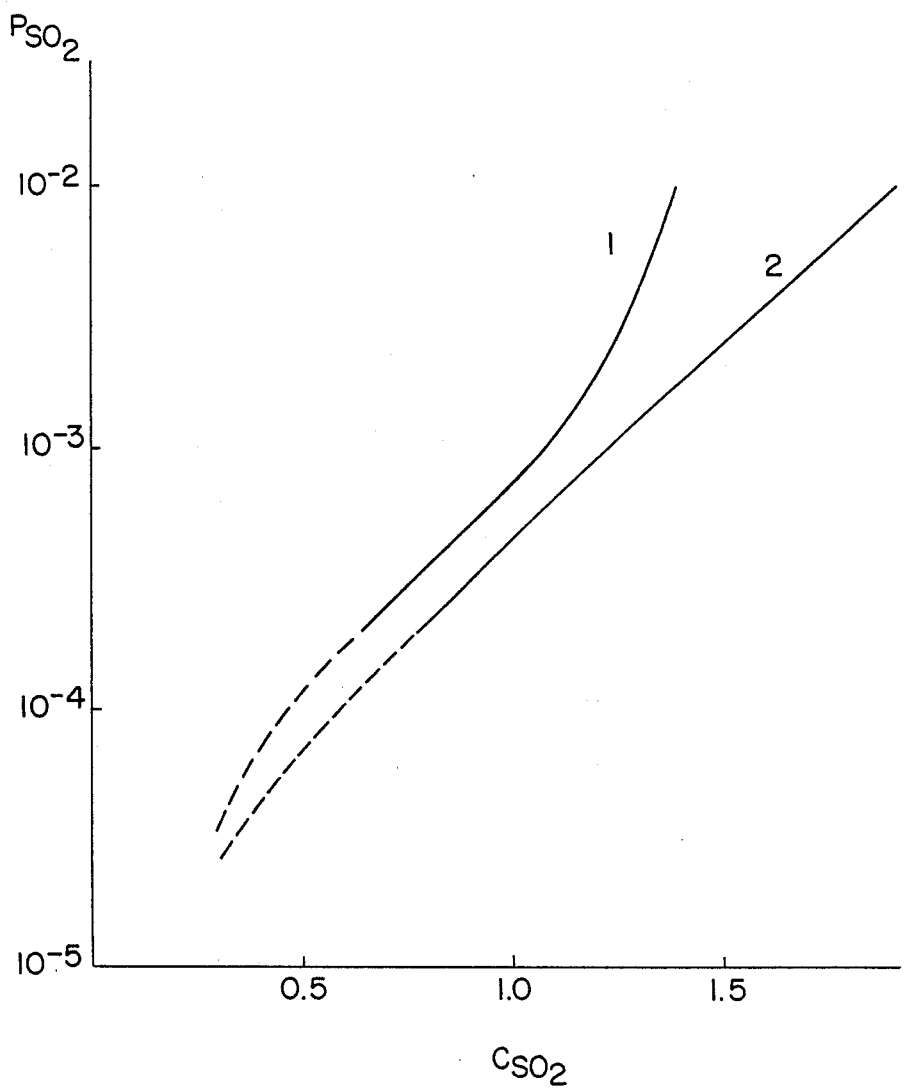
FIG. 2 illustrates experimental gas-liquid equilibrium curves for $SO_2$ in certain buffer solutions.

FIG. 2 illustrates experimental gas-liquid equilibrium curves for $SO_2$ in (1) 3.00 M $Na_2HPO_4+1.00$ M $NaH_2PO_4$ and in (2) 1.70 M $Na_2SO_3$ buffers at 55° C. The abscissa is the $SO_2$ concentration in moles per liter, and the ordinate is the $SO_2$ partial pressure in bar. These measurements were carried out in an equipment which is described in Section C below. Nitrogen was in these measurements used for the gas circulation circuit which equilibrates with the $SO_2$-loaded solution. The lines are broken at lower partial pressures where the measurements are less accurate. FIG. 2 shows the phosphate buffer to have the higher absorption capacity for $SO_2$, which is further demonstrated by the following data read from FIG. 2.

| Partial pressure at equilibrium $p^*_{SO2}$ (bar) | $10^{-2}$ | $10^{-3}$ | $10^{-4}$ |
|---|---|---|---|
| Buffer | $C_{SO2}$ | (moles/l) | |
| Phosphate | 1.93 | 1.23 | 0.60 |
| Sulfite | 1.39 | 1.07 | 0.50 |
| Ratio phosphate/sulfite | 1.39 | 1.15 | 1.20 |

Over the highly relevant partial pressure range $10^{-2}$–$10^{-4}$ bar the phosphate buffer has accordingly an ability to bind 1.15 to 1.39 times more $SO_2$ per unit volume than the sulfite buffer tested. Together with the observations reported in a following section that the phosphate buffer also is more easily depleted of $SO_2$ than the sulfite buffer upon evaporation, the effective absorption capacity for the phosphate buffer is presumably even higher than indicated by these figures.

The solution fed to the absorber in the present process should suitably have a pH above 5.5, usually above 6.0, preferably above 6.2, in particular about 6.5. The solution should contain at least 2 moles and particularly above 2.5 moles per liter of disodium hydrogen phosphate.

B. Low steam consumption and complete absorption

α Batchwise operation

Buffer solutions loaded with $SO_2$ to known concentrations were subjected to evaporation by boiling at atmospheric pressure in a 5 liter glass vessel equipped with 4 baffles, a stirrer and a submerged electric heating element in the form of a spiral. The escaping vapor was passed through a condenser for condensing the steam and then together with the condensate into a receiving bottle containing an aqueous $H_2O_2$ solution in which all $SO_2$ was oxidized to sulfuric acid which was then determined quantitatively by titration with standard NaOH. There were 3 receiving bottles attached in parallel via glass valves to a common tube from the condenser. This allowed the evaporation process to be followed by replacing one receiving bottle with another about every 8 minutes, without disrupting the process.

The experiments were stopped when the surface of the suspension had fallen too near the top of the heating element, in order to avoid overheating.

The $SO_2$ concentration in the buffer solution was determined iodometrically. The amount of $H_2O+SO_2$ evaporated was determined by weighing. The density of the solution was determined by weighing known volumes. After the evaporation was stopped, the crystals formed in the vessel were first dissolved by adding water, and then the solution was diluted to the start volume before the $SO_2$ content, the density and the pH were measured. The following results were obtained.

EXAMPLE 1

| | |
|---|---|
| Start solution: Volume 3 l, density $\rho$ = 1.43 g/ml, | |
| pH = | 5.15 |
| Total weight of start solution 3 × 1430 = | 4290 g |
| $Na_2HPO_4$ 3 M = 3 × 3 × 142 g = 1278 g | |
| $NaH_2PO_4$ 1 M = 3 × 1 × 120 g = 360 g | |
| $SO_2$ 1,54 M = 3 × 1.54 × 64 g = 295.7 g | |
| Sum: salts + $SO_2$ = | 1933.7 g |
| Difference: $H_2O$ = | 2356.3 g |

Results

| (1) | 1 | 2 | 3 | 4 | 5 | 6 | 7 | 8 | 9 | 10 |
|---|---|---|---|---|---|---|---|---|---|---|
| (2) | 110.6 | 111.9 | 114.9 | 115.1 | 113.5 | 115.5 | 113.1 | 115.2 | 112.0 | 114.4 |
| (3) | 6.39 | 6.65 | 6.74 | 6.93 | 6.90 | 7.23 | 7.24 | 7.54 | 7.60 | 7.93 |
| (4) | 6.39 | 13.04 | 19.78 | 26.71 | 33.61 | 40.84 | 48.08 | 55.62 | 63.22 | 71.15 |
| (5) | 16.3 | 15.8 | 16.0 | 15.6 | 15.4 | 15.0 | 14.6 | 14.3 | 13.7 | 13.5 |
| (6) | 104.21 | 105.25 | 108.16 | 108.17 | 106.6 | 108.27 | 105.86 | 107.66 | 104.4 | 106.47 |
| (7) | 104.21 | 209.46 | 317.62 | 425.79 | 532.39 | 640.66 | 746.52 | 854.18 | 958.58 | 1065.05 |
| (8) | 4.4 | 8.9 | 13.5 | 18.2 | 22.6 | 27.2 | 31.7 | 36.3 | 40.7 | 45.2 |
| (9) | 95.6 | 91.1 | 86.5 | 81.9 | 77.4 | 72.8 | 68.3 | 63.7 | 59.3 | 54.8 |
| (10) | 0.033 | 0.068 | 0.103 | 0.139 | 0.175 | 0.213 | 0.250 | 0.290 | 0.324 | 0.371 |
| (11) | 1.51 | 1.47 | 1.44 | 1.40 | 1.37 | 1.33 | 1.29 | 1.25 | 1.21 | 1.17 |
| (1) | 11 | 12 | 13 | 14$^{xx}$ | 15 | 16 | 17 | 18 | 19$^{xxx}$ | Sum |
| (2) | 112.8 | 112.0 | 109.9 | 112.0 | 109.3 | 114.3 | 113.5 | 120 | 12.2 | 2052.2 |
| (3) | 8.13 | 8.35 | 8.47 | 8.92 | 9.20 | 10.61 | 12.05 | 14.94 | 1.66 | 153.5 |
| (4) | 79.28 | 87.63 | 96.10 | 105.02 | 114.22 | 124.83 | 136.88 | 151.82 | 153.48 | |
| (5) | 12.9 | 12.4 | 12.0 | 11.6 | 10.9 | 9.8 | 8.4 | 7.0 | 6.3 | |
| (6) | 104.67 | 103.65 | 101.43 | 103.08 | 100.1 | 103.69 | 101.45 | 105.06 | 10.54 | |
| (7) | 1169.7 | 1273.3 | 1374.8 | 1477.9 | 1578.0 | 1681.7 | 1783.1 | 1888.2 | 1898.7 | |
| (8) | 49.6 | 54.0 | 58.3 | 62.7 | 67.0 | 71.4 | 75.7 | 80.1 | 80.6 | |
| (9) | 50.4 | 46.0 | 41.7 | 37.3 | 33.0 | 28.6 | 24.3 | 19.9 | 19.4 | |
| (10) | 0.413 | 0.456 | 0.500 | 0.547 | 0.595 | 0.650 | 0.713 | 0.791 | 0.799 | |
| (11) | 1.13 | 1.08 | 1.04 | 0.99 | 0.95 | 0.89 | 0.83 | 0.75 | 0.74 | |
| Sum of water evaporated | | | | | | | | | | 1898.7 |

-continued
Results

| | |
|---|---|
| water evaporated as percentage of water added at start: | 80.58% |

Explanation to first column:
(1) Sample number
(2) Sum of water and $SO_2$ evaporated in this sample, g.
(3) $SO_2$ evaporated in this sample, g.
(4) Sum of $SO_2$ evaporated including this sample, g.
(5) Ratio between evaporated water and $SO_2$ in this sample, i.e. the specific steam requirement S, g/g
(6) Water evaporated in this sample, g.
(7) Sum of water evaporated including this sample, g.
(8) Water evaporated as percentage of water at start.
(9) Remaining water as percentage of water at start.

(10) Concentration of $SO_2$ evaporated referred to start volume: $\left(\frac{1.54 \times (4)}{295.7}\right)(M)$

(11) Equivalent concentration of remaining $SO_2$ referred to start volume $(1.54 - (10))(M)$.
xxCrystallization started 110 minutes after start. No incrustation on the heating element observed.
xxxHeating stopped after sample No. 18

| | |
|---|---|
| Total weight including vessel: | |
| Before evaporation | 8785 g |
| After evaporation | 6721 g |
| Difference = Evaporated $SO_2$ + $H_2O$: | 2064 g |

| | |
|---|---|
| Sum of all samples of evaporated $H_2O$ + $SO_2$: | 2052.2 g |
| (The discrepancy is within a reasonable error of analysis). | |
| $SO_2$ at start $1.54 \times 3 \times 64.1 =$ | 291.6 g |
| Sum $SO_2$ all samples (a) | 153.5 g |
| $SO_2$ remaining after evaporation (b) | 141.4 g |
| Sum (a) + (b) | 294.9 g |
| (The discrepancy is within a reasonable error of analysis). | |
| pH in rest solution after dilution as explained | 5.83 (55° C.) |
| Density of same solution | 1.40 g/ml |
| $SO_2$ concentration in same solution | 0.72 M |
| $H_2O$ + $SO_2$ evaporated | 2052.2 g |
| $SO_2$ evaporated | 153.3 g |
| $H_2O$ evaporated | 1898.7 g |
| $H_2O$ remaining = | 457.3 g |
| $H_2O$ remaining as % of added (457.3/2356) × 100 | 19.4 |
| Salt added 1278 + 360 = | 1638 g |
| $H_2O$ remaining as % of salt + $H_2O$ (457.3/(457.3 + 1638)) = | 21.8 |

COMPARATIVE EXAMPLE

| Comparative example | |
|---|---|
| Start solution | 3000 ml |
| | 1.70 M $Na_2SO_3$ |
| | 1.23 M $SO_2$ |
| | $\rho = 1.19$ |

| Comparative example | |
|---|---|
| | pH = 5.40 |

Results:

| Sample no. | 1 | 2 | 3 | 4 | 5 | 6 | 7 | 8 |
|---|---|---|---|---|---|---|---|---|
| $H_2O$ + $SO_2$ evap. (g) | 107.4 | 109.3 | 126.1 | 110.4 | 122.8 | 113.5 | 121.1 | 115.7 |
| $SO_2$ evap. (g) | 2.19 | 2.56 | 2.96 | 2.64 | 2.99 | 2.80 | 3.08 | 3.00 |
| $S\left(\frac{g\ H_2O\ evap.}{g\ SO_2\ evap.}\right)$ | 48.0 | 41.7 | 41.6 | 40.8 | 40.1 | 39.5 | 38.4 | 37.6 |

| Sample no.: | 9 | 10 | 11$^x$ | 12 | 13 | 14 | 15 | 16 | 17 | Sum |
|---|---|---|---|---|---|---|---|---|---|---|
| $H_2O$ + $SO_2$ evap. (g) | 118.5 | 113.1 | 118.3 | 112.7 | 116.8 | 113.2 | 116.7 | 114.0 | 119.6 | 1969.3 |
| $SO_2$ evap. (g) | 3.16 | 3.08 | 3.37 | 3.58 | 4.49 | 5.43 | 7.13 | 8.65 | 11.26 | 72.4 |
| $S\left(\frac{g\ H_2O\ evap.}{g\ SO_2\ evap.}\right)$ | 36.5 | 35.7 | 34.1 | 30.5 | 25.0 | 19.8 | 15.4 | 12.1 | 9.6 | |

$^x$Crystallization started 80–85 min. after start. The crystals were observed to form on the heating element

| Mass balances: | |
|---|---|
| Total weight including vessel: Before | 8055 g |
| After | 6065 g |
| Difference | 1990 g |
| Weight of all samples | 1969.3 g |
| (The discrepancy is within a reasonable error of analysis). | |
| $SO_2$ at start $1.23 \times 3 \times 64.1 =$ | 236.5 g |
| Sum of $SO_2$ in all samples (a) | 72.4 g |
| $SO_2$ remaining after evaporation (b) | 155.1 g |
| Sum (a) + (b) | 227.5 g |
| Loss of $SO_2$: 236.5 − 227.5 = | 9.0 g |
| Part of this loss can be explained by $SO_2$ escaping as gas when the vessel was opened after evaporation. | |
| pH in rest solution after dilution as explained | 5.94 (55° C.) |
| Density of same $\rho =$ | 1/18 g/ml |
| $SO_2$ concentration in same | 0.80 M |

CONCLUSIONS

The results of the batch evaporation experiments allow the following conclusions, referring to the conditions of the experiments:

The specific energy (steam) requirement, S, for driving off $SO_2$ from the clear solutions of the phosphate buffer is about ⅓ of the consumption for the clear sulfite solutions. This is surprising, since from the $SO_2$ gasliquid equilibrium data at hand referring to 55° C., one would rather expect the phosphate buffer to require distinctly more energy than the sulfite buffer (FIG. 2).

When the crystallization starts, the steam consumption drops for both buffers.

Evaporation with crystallization is problematic with the sulfite buffer because of its tendency to form deposits on the heating element. This problem was not seen with the phosphate buffer.

In Example 1 for the phosphate buffer, after evaporation of about 80% of the $H_2O$, the resulting residue attained a very thick, melt-like consistency. The concentration of $SO_2$ in the regenerated buffer, after dilution to the start-volume, was 0.72 M, corresponding to an equilibrium $SO_2$ partial pressure at 55° C. of $1.6 \times 10^{-4}$ bar (FIG. 2). Although this in many cases will be satisfactory, in other cases an even lower equilibrium $SO_2$ partial pressure may be required, in order that very strict emission regulations can be met. However, judging from the consistency of said residue, it seemed as if a further reduction of the $SO_2$ (and $H_2O$) content of the buffer by evaporation would not be possible.

Based on extensive investigations typically represented by Example 2, we have unexpectedly found that it is possible to obtain substantially lower residual concentrations of $SO_2$ by evaporation when the $SO_2$ laden buffer (from the absorber) is added continuously into circulating, already evaporated buffer in the evaporator system. In fact, as brought out by Example 2, we were in this way able to reduce the $SO_2$ concentration of the regenerated buffer down to 0.34 M with a corresponding $SO_2$ equlibrium partial pressure of about $4 \times 10^{-5}$ bar. We have found that in this way it suffices to remove by evaporation more than 70%, particularly more than 75% of the water in the liquor, preferably more than 80%, and most preferably more than 85%, in order to achieve satisfactory results. In further studies we have found that the percentage of water that needs to be evaporated in order to achieve a low enough equilibrium partial pressure for $SO_2$ in the regenerated buffer, may vary somewhat with the buffer composition, but that it in general needs to be at least 70%.

Semicontinuous operation

An $SO_2$ containing buffer solution was, by means of a metering pump, conveyed to a 500 ml glass flask serving as a boiler and heated from the outside for evaporating a $SO_2$-steam mixture at atmospheric pressure from the feed solution. The experiments were carried out semicontinuously by allowing the residue to accumulate in the boiler. The vapour was first passed through a condenser for condensation of steam and then together with the condensate down into an aqueous $H_2O_2$ solution, in which all $SO_2$ was oxidized to sulfuric acid which was then determined quantitatively by titration with standard NaOH. The evaporation procedure was followed by very quickly replacing the $H_2O_2$ bottle every 30 minutes.

Before starting the pump, the boiler was charged with a $SO_2$-free buffer which was subjected to evaporation. The experiments were stopped when the stirrer could not function properly because of too much and too thick slurry.

The $SO_2$ concentrations in the liquid feed were determined iodometrically, and the total liquid volume charged was determined by weighing the container with feed liquid before and after the experiment and by density measurements.

The $SO_2$ content in the slurry remaining in the boiler after the experiment had been terminated, was determined iodometrically after addition of water for dissolution and dilution to a known volume.

The supply from the pump was controlled with a rotameter calibrated with pure water. Due to the difference in physical properties between water and the buffer solutions, the stated volumetric supply rates should only be taken as indications.

EXAMPLE 2

| Start solution | 250 ml |
| --- | --- |
| | 1.4 M $NaH_2PO_4$ |
| | 1.4 M $Na_2HPO_4$ |

To the start solution 20 ml of water was added, and the resulting solution was evaporated until cloudiness was observed. Then 15 g of $Na_2HPO_4.2H_2O$ crystals were added, and the pump was started.

| Feed solution pH = 5.10, density $\rho$ = | 1428 g/l |
| --- | --- |
| $Na_2HPO_4$: 3.00 M = 3 × 142 = 426 g/l | |
| $NaH_2PO_4$: 1.00 M = 1 × 120 = 120 g/l | |
| $SO_2$: 1.50 M = 1.50 × 1.5 × 64 = 96 g/l | |
| Sum: salts + $SO_2$ | 642 g/l |
| $H_2O$ added: 1428 − 642 = | 786 g/l |

| Sample No. | 1 | 2 | 3[1] | 4 | 5 | 6 | 7[2] | 8 | 9[3] | Sum |
| --- | --- | --- | --- | --- | --- | --- | --- | --- | --- | --- |
| Feed rate, approx. (ml/min) | 5.0 | 2.2 | 3.0 | 6.5 | 5.0 | 3.0 | 3.0 | 5.05 | 5.0 | |
| $H_2O$ + $SO_2$ evap. (g) | 125.8 | 123.6 | 115.6 | 101.6 | 122.9 | 120.0 | 118.9 | 106.6 | 33.4 | 968.4 |
| $SO_2$ evap. (g) | 4.2 | 11.45 | 13.3 | 8.3 | 10.3 | 11.94 | 12.70 | 10.94 | 3.61 | 86.74 |
| $S\left(\dfrac{\text{g } H_2O\text{-evap.}}{\text{g } SO_2 \text{ evap.}}\right)$ | 28.9 | 9.98 | 7.70 | 11.2 | 10.91 | 9.05 | 8.36 | 8.95 | 8.25 | |

[1] The feed rate was increased from 3 to 7 ml/min. the last 10 minutes of this sampling period in order to reduce the density of the slurry.
[2] The feed rate was increased from 3.0 to 5.0 ml/min. the last 15 minutes.
[3] The feed was stopped after 5 min. and the sampling was terminated.

COMMENTS TO EXAMPLE 2

| Total feed of $SO_2$ buffer: | 1.151 l |
| --- | --- |
| Total amount of $SO_2$ in feed: 1.151 × 1.50 ×0 64.1 = | 110.67 g |
| Total amount of $SO_2$ evaporated (Samples 1-9): | 86.74 g |
| Calculated amount of $SO_2$ remaining in evaporator: | 23.93 g |

|  |  |
|---|---|
| Amount of $SO_2$ remaining in evaporator found by analysis of residue:<br>(The discrepancy is within a reasonable error of analysis). | 25.3 g |
| Residue of $SO_2$ found as equivalent concentration in the feed liquid (= $SO_2$ concentration of the regenerated buffer): 25.3/(1.151 × 64.1) = | 0.34 M | precipitated.

| Feed solution: | |
|---|---|
| | 1.70 M $Na_2SO_3$ |
| | 1.25 M $SO_2$ |
| | $\rho = 1.21$ g/ml |
| | pH = 5.38 |

Results:

| | Sample No. | | | | | | | | | |
|---|---|---|---|---|---|---|---|---|---|---|
| | 1[1] | 2 | 3 | 4 | 5 | 6[2] | 7 | 8 | 9[3] | Sum |
| Feed rate, approx. (ml/min) | 6.5 | 7.0 | 7.0 | 6.5 | 6.5 | 6.5 | 6.5 | 6.5 | 6.5 | |
| $SO_2 + H_2O$ evap. (g) | 129.5 | 139.7 | 139.9 | 141.0 | 145.4 | 144.8 | 145.2 | 147.6 | 132.2 | 1265.3 |
| $SO_2$ evap. (g) | 0.22 | 1.71 | 4.49 | 7.07 | 9.33 | 10.48 | 11.05 | 11.57 | 10.84 | 66.76 |
| S(g $H_2O$/g$SO_2$) | 588 | 80.7 | 30.2 | 18.9 | 14.6 | 12.8 | 12.1 | 11.8 | 11.2 | |

[1]Crystallization starts after 10 min.
[2]Strongly yellow colour of the suspension
[3]The pump stopped after 15 min. Vigorous boiling. Heating element turned off after 25 min.

| | |
|---|---|
| Corresponding pH according to FIG. 1 at 55° C.: about | 6.35 |
| Weight of $H_2O$ added by pump 1.151 × 786 = | 904.7 g |

Weight of water evaporated during continuous feed of buffer is then approximately:
($SO_2 + H_2O$) evap. − $SO_2$ evap. − extra evap. in sample no. 1:

| | |
|---|---|
| = 968.4 − 86.7 − (125.8 − 4.2 − 4.2 × 9.0)* = | 797.9 g' |
| $H_2O$ remaining of amount fed by pump 904.7 − 797.9 = | 106.8 g |
| $H_2O$ remaining as percent (106.8/904.7) × 100 = | 11.8 |

*This factor will compensate for the fact that the first sample does not represent the equilibrium which exists in the subsequent samples as in a continuous process. In fact too much water was evaporated during the first sampling period due to the high initial water content of the buffer. It will be seen that in samples 2–9 the ratio S is about 9. This means that with an evaporation of 4.2 g of $SO_2$, an amount of 4.2 × 9 g $H_2O$ would "normally" be evaporated in continuous operation, i.e. a total evaporation of $H_2O + SO_2$ of 42 g would "normally" be expected. In order to reflect a continuous operation the "extra" amount (125.8 − 42) of 83.3 g must be subtracted from the total amount.

Thus, in this simulated continuous process close to 88% of the water is evaporated.

The steam consumption S=8–9 tons per ton of $SO_2$ may with double effect evaporation presumably be reduced to S=5–6 tons per ton $SO_2$. This compares with the 7–8 tons per ton $SO_2$ referred to above for the sulfite process.

Interpolation of the gas-liquid-equilibrium data in FIG. 2 gives the following $SO_2$ partial pressures at equilibrium, $p^*_{SO2}$:

| $c_{SO2}$ moles/l | $p^*SO_2$, 55° C. (bar) |
|---|---|
| 0.34 | <0.00004 |
| 1.50 | 0.0024 |

The absorption unit will often be operated at about 55° C. From these equilibrium pressures it may be concluded that 1.50 M $SO_2$ in the buffer solution may be obtained with relatively low partial pressures of $SO_2$ of the feed gas, and that with 0.34 M $SO_2$ in the feed solution to the absorber, it may be possible to obtain a surprisingly complete $SO_2$ absorption.

COMPARATIVE EXAMPLE

| | |
|---|---|
| Start solution in evaporator | 0.25 l<br>1.33 M $Na_2SO_3$ |

74.02 g of $H_2O$ was evaporated, and the feed pump was started before any crystals had At the end the suspension was extraordinary thick and viscous and had a total volume of about 0.5 l. The crystals were dissolved by addition of water to a volume of 2 l. pH measured in the resulting solution = 6.45 (55° C.).

Further data for the experiment were as follows:

| | |
|---|---|
| Evaporated $SO_2$ according to samples 1–9:<br>66.76 g = | 1.04 moles |
| Total weight of feed 1730 g<br>Volume of feed 1.730/1.21 = | 1.430 l |
| $SO_2$ added with feed 1.43 × 1.25 = | 1.79 moles |
| $Na_2SO_3$ added with feed 1.43 × 1.70 = | 2.43 moles |
| $Na_2SO_3$ in the start solution 1.33 × 0.25 = | 0.33 moles |
| $SO_2 + Na_2SO_3 + NaHSO_3$ in evaporator at the termination: | 3.43 moles |
| $SO_2$ remaining in evaporator as equivalent concentration in regenerated buffer (3.43 − (2.43 + 0.33))/1.430 = | 0.47 M |
| S-balance:<br>Calculated from S-containing material added ($SO_2$ and $Na_2SO_3$):<br>1.79 + 2.43 + 0.33 = | 4.55 moles |
| Calculated on the basis of evaporated $SO_2$ and residue of S-containing material in the evaporator;<br>1.04 + 3.43 = | 4.47 moles |

The discrepancy is within reasonable analysis error.

The high values for the initial specific steam consumption is due to the high pH in the start solution. Presumably close to stable conditions with S=11–12 g/g were not attained until sample no. 7.

The pH values of the start and regenerated solutions are in good conformity with the information given above for commercial plants. This also applies to the concentrations of $Na_2SO_3$ and $SO_2$.

Interpolation of the gas-liquid equilibrium data for $SO_2$ at 55° C. in FIG. 2 gives the following $SO_2$ equilibrium partial pressures. $p^*SO_2$:

| $c_{SO2}$ mol/l | $p^*_{SO2}$, 55° C. (bar) |
|---|---|
| 0.47 | 0.0001 |
| 1.25 | 0.0025 |

The absorption unit will often operate at about 55° C. From these data it is then derived that 1.25 M $SO_2$ in the loaded buffer requires a rather high $SO_2$ partial pressure in the feed gas. Also the partial pressure of 0.0001 bar in the regenerated buffer is relatively high compared to the German norm for clean-up of 0.00014 bar for large boilers.

CONCLUSIONS

The results show substantially lower S-values for the phosphate than for the sulfite buffer, 8–9 compared to about 11 tons of steam/ton of $SO_2$. This is in contradiction to the higher $SO_2$ partial pressures of the sulfite buffer at 55° C. Thus these experiments indicate that $SO_2$ is surprisingly easier to liberate from the phosphate buffer than from the sulfite buffer upon boiling at atmospheric pressure.

At 55° C. the $SO_2$ partial pressure in the regenerated phosphate buffer is only about ⅓ of the partial pressure of $SO_2$ in regenerated sulfite buffer. This would make the phosphate system better suited than the sulfite system when extremely low residual content of $SO_2$ in the purified gas is required.

C. Low oxidation losses

Figure 3:
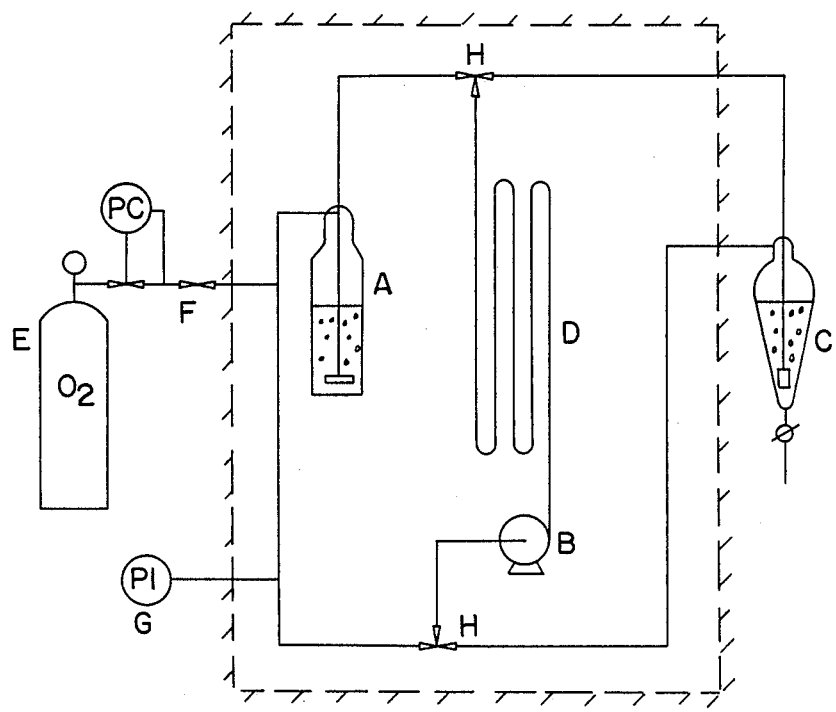
FIG. 3 illustrates a gas-circulation circuit for measuring oxidation losses.

A gas-circulation circuit illustrated in FIG. 3 comprised a gas-scrubbing bottle A. a teflon membrane pump B, a gas absorption bottle C, and a glass tube D. The circulation circuit was connected to an oxygen-filled gas cylinder E, through a reduction valve F, for constant supply pressure. Before the experiment the circulation circuit was filled with oxygen, and the gas scrubbing bottle A was charged with a known volume of buffer solution charged with $SO_2$.

By adjusting the three way valves H the gas flow could be directed through alternatively (a) the tube D and the gas scrubbing bottle A or (b) the tube D and the absorption bottle C.

The oxidation experiment was started by starting the pump B to circulate the oxygen gas through the buffer in bottle A.

The experiment was stopped by stopping the pump. The $SO_2$ content of the absorption bottle A was determined iodometrically before and after the experiment. The $SO_2$ content in the gas phase in the gas circulation circuit of known volume, was determined after the experiment by standard base titration after absorption in an aqueous $H_2O_2$ solution in the bottle C. The whole apparatus was kept at a constant temperature.

100 ml of buffer solution was used for each experiment. All experiments were carried out at 60° C. at 1 atm. total pressure.

The oxidation losses were calculated from the following formula:

$$\% \text{ oxidized} = \frac{n^*_{start} - (n^*_{end} + n_{gas})}{n_{SO_2, start}} \times 100$$

where $n^*_{start}$ = total no. of moles of $S^{IV}$-compounds ($Na_2SO_3$, $NaHSO_3$ and $SO_2$) in buffer at start $n^*_{end}$ = do. after oxidation $n_{gas}$ = no. of moles of $SO_2$ present in the gas volume after oxidation $n_{SO_2, start}$ = no. of moles of $SO_2$ added to buffer before start.

The following results were obtained:

| Oxidation time, min. | 30 | 60 |
|---|---|---|
| Oxidation loss %: | | |
| Phosphate buffer | 0.9 | 0.9 |
| Sulfite buffer | 8.7 | 23.1 |

The buffer compositions at the start were:

| The buffer compositions at the start were: | |
|---|---|
| Phosphate buffer: 3.00 M $Na_2HPO_4$ + 1.00 M $NaH_2PO_4$ + 0.50 M $Na_2SO_4$ + 1.50 M $SO_2$ | pH = 5.20 |
| Sulfite buffer: 1.70 M $Na_2SO_3$ + 0.50 M $Na_2SO_4$ + 1.22 M $SO_2$ | pH = 5.30 |

The oxidation in the sulfite system is seen to be very substantial, whereas the oxidation in the phosphate system is so small that it is considered to be insignificant. This is supported by the following observations:

By closing the valve F during the oxidation experiment the oxygen uptake by the buffer in bottle A due to oxidation could be followed visually by observing the movement of the liquid level in the manometer G. For the sulfite system the level moved rather rapidly. For the phosphate system there was no observable change of the level even after 5 minutes. This indicates that only the sulfite system exhibited significant oxidation.

I claim:

1. Process for the purification of $SO_2$ containing gases by means of an aqueous absorption solution in an absorption unit and regeneration of this solution after absorption, which comprises absorbing from said gases $SO_2$ in an aqueous absorption solution which is added to the absorption unit with a pH of at least 5.5 and a content of at least 2.0 moles of disodium-hydrogen phosphate per liter, after absorption removing $SO_2$ from the absorption solution together with water by evaporating at least 70% of the water in the absorption solution, to form an evaporation residue which is diluted with water to form a regenerated absorption solution which may be added to the absorption unit, and recovering $SO_2$ from the evaporated water-$SO_2$ mixture.

2. The process of claim 1, which comprises using an aqueous absorption solution which is added to the absorption unit with a pH of above 6.0.

3. The process of claim 1, which comprises using an aqueous absorption solution which is added to the absorption unit with a pH of above 6.2.

4. The process of claim 1, which comprises using an aqueous absorption solution which is added to the absorption unit with a pH of about 6.5.

5. The process of claim 1, which comprises using an absorption solution containing $Na_2HPO_4$ and $NaH_2PO_4$ in a molar ratio of 30:1 to 1:1.

6. The process of claim 5, which comprises using an absorption solution containing $Na_2HPO_4$ and $NaH_2PO_4$ in a molar ratio of 12:1 to 2:1.

7. The process of claim 1, wherein the absorption solution after absorption is mixed with regenerated absorption solution prior to evaporation.

8. The process of claim 7, which is carried out as a continous process in which the absorption solution after absorption is added to a stream of regenerated absorption solution.

9. The process of claim 1, wherein the evaporation residue is diluted with water recovered from the evaporated water-$S_2$-mixture.

10. The process of claim 9, wherein fresh buffer salts are added to compensate for losses.

11. The process of claim 1, wherein at least 75% of the water in the absorption solution is evaporated after absorption.

12. The process of claim 1, wherein at least 80% of the water in the absorption solution is evaporated after absorption.

13. The process of claim 1, wherein at least 85% of the water in the absorption solution is evaporated after absorption.

14. The process of claim 1, wherein at least 80.6% of the water is evaporated from the absorption solution.

15. The process of claim 1, wherein at least 88.2% of the water is evaporated from the absorption solution.

* * * * *

UNITED STATES PATENT AND TRADEMARK OFFICE
CERTIFICATE OF CORRECTION

PATENT NO. : 4,948,572
DATED : August 14, 1990
INVENTOR(S) : Olav ERGA

It is certified that error appears in the above-identified patent and that said Letters Patent is hereby corrected as shown below:

Column 1, lines 5-6, change to read

--This application is a continuation of now abandoned Ser. No. 07/054,912 filed May 28, 1987, PCT/NO86/00064 filed September 16, 1986.--

Signed and Sealed this

Second Day of April, 1991

Attest:

HARRY F. MANBECK, JR.

Attesting Officer

Commissioner of Patents and Trademarks